(12) United States Patent
Matsutani

(10) Patent No.: US 8,264,554 B2
(45) Date of Patent: Sep. 11, 2012

(54) IMAGING APPARATUS AND METHOD OF OBTAINING A ROLL ANGLE OF THE IMAGING APPARATUS, AND CORRECTING DETECTED ROLL ANGLE

(75) Inventor: Atsushi Matsutani, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 348 days.

(21) Appl. No.: 12/667,661

(22) PCT Filed: Jul. 23, 2008

(86) PCT No.: PCT/JP2008/063617
§ 371 (c)(1),
(2), (4) Date: Jan. 4, 2010

(87) PCT Pub. No.: WO2009/017137
PCT Pub. Date: Feb. 5, 2009

(65) Prior Publication Data
US 2010/0208080 A1   Aug. 19, 2010

(30) Foreign Application Priority Data
Jul. 27, 2007   (JP) .................. 2007-195628

(51) Int. Cl.
*H04N 5/228* (2006.01)
*G03B 17/00* (2006.01)
*G01D 18/00* (2006.01)

(52) U.S. Cl. .................. 348/208.4; 348/208.2; 348/187; 348/208.13; 396/52; 396/53; 396/55; 702/85

(58) Field of Classification Search ............... 348/208.3, 348/208.4, 208.2, 208.13, 180, 187, 744–747, 348/222.1, 208.99–208.16; 702/85, 104, 702/108, 111, 116; 396/52, 53, 55, 370, 396/361–363
See application file for complete search history.

(56) References Cited

U.S. PATENT DOCUMENTS

| 6,781,622 | B1 * | 8/2004 | Sato et al. .................. 348/208.4 |
| 7,970,266 | B2 * | 6/2011 | Hashi et al. ...................... 396/55 |
| 8,089,549 | B2 * | 1/2012 | Yasuda et al. ............ 348/333.02 |
| 2004/0212699 | A1 * | 10/2004 | Molgaard ................ 348/231.99 |
| 2005/0088546 | A1 * | 4/2005 | Wang ............................ 348/239 |
| 2006/0002751 | A1 | 1/2006 | Matsutani |

FOREIGN PATENT DOCUMENTS

| JP | 10-150596 A | 6/1998 |
| JP | 11-136575 A | 5/1999 |
| JP | 2001-251552 A | 9/2001 |

(Continued)

*Primary Examiner* — Lin Ye
*Assistant Examiner* — Marly Camargo
(74) *Attorney, Agent, or Firm* — Dickstein Shapiro LLP

(57) ABSTRACT

An imaging apparatus includes an image pickup device, a device that obtains an image from the image pickup device, a sensor that detects a roll angle of the sensor, wherein the sensor detects a reference roll angle of the sensor when the imaging apparatus is disposed at a predetermined roll angle, a device that calculates a reference roll angle of the image pickup device by using a reference image from the image pickup device when the imaging apparatus is disposed at the predetermined roll angle and a device that corrects a roll angle of the sensor by calculating a relative roll angle from the reference roll angle of the image pickup device and the reference roll angle of the sensor.

7 Claims, 6 Drawing Sheets

FOREIGN PATENT DOCUMENTS

| | | |
|---|---|---|
| JP | 2004-343476 A | 12/2004 |
| JP | 2005-348212 A | 12/2005 |
| JP | 2006-59202 A | 3/2006 |
| JP | 2006059202 A * | 3/2006 |
| JP | 2006-245642 A | 9/2006 |
| JP | 2006-285073 A | 10/2006 |
| JP | 2007-43584 A | 2/2007 |
| JP | 3957888 B2 | 5/2007 |

* cited by examiner

SW5 ⋯ ZOOM SWITCH SW5 [TELE]
SW6 ⋯ ZOOM SWITCH SW6 [WIDE]
SW7 ⋯ UP SWITCH
SW8 ⋯ RIGHT SWITCH
SW9 ⋯ OK SWITCH
SW10 ⋯ LEFT SWITCH

SW11 ⋯ DOWN SWITCH / MACRO SWITCH
SW12 ⋯ DISPLAY SWITCH
SW13 ⋯ DELETION SWITCH
SW14 ⋯ MENU SWITCH
SW15 ⋯ POWER SUPPLY SWITCH

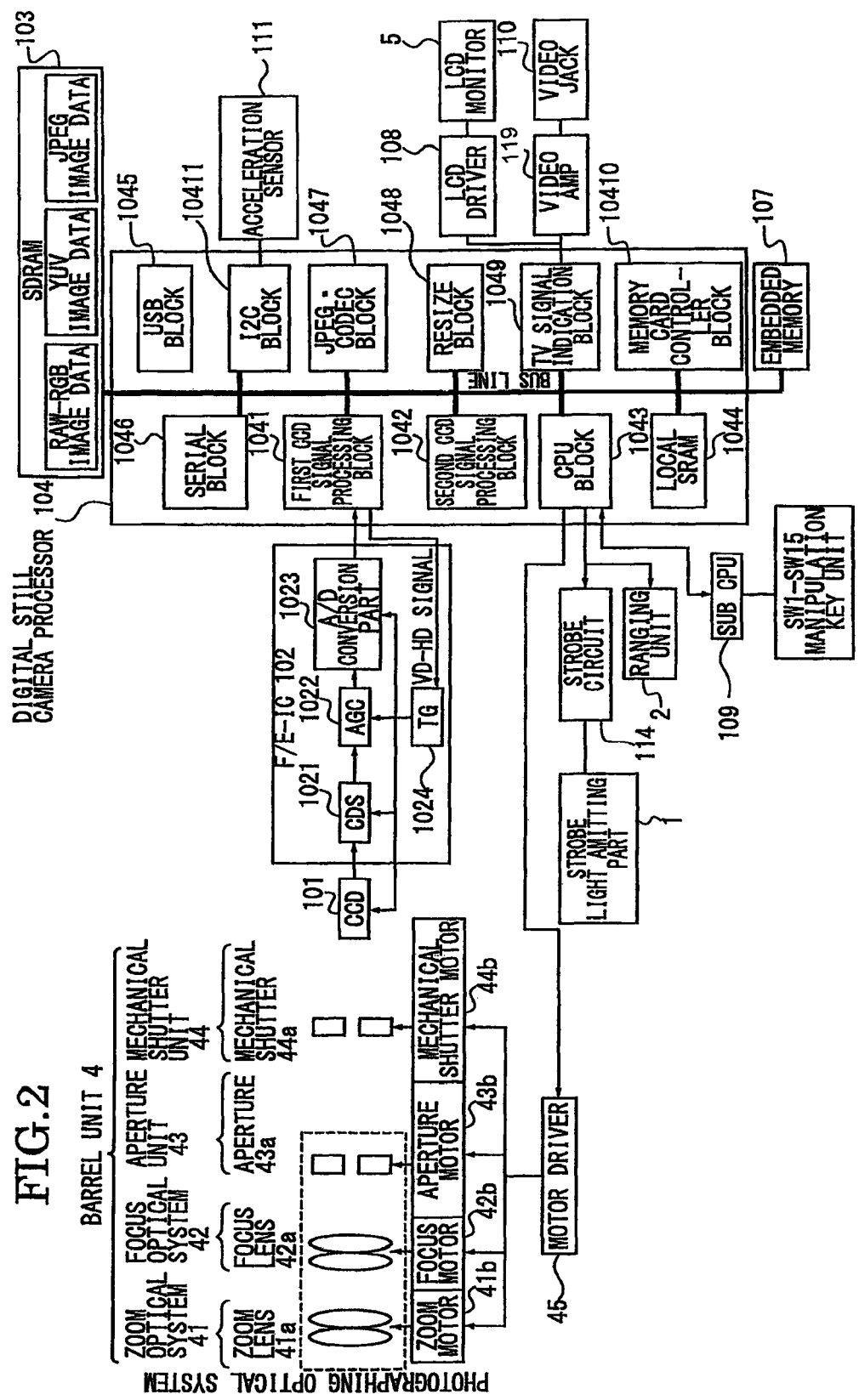

20 CHART

10 DIGITAL CAMERA

21a CROSS

FEATURE POINT A(a,b)

20

21b CROSS

FEATURE POINT B(c,d)

DIRECTION OF GRAVITATIONAL FORCE

IMAGING APPARATUS AND METHOD OF OBTAINING A ROLL ANGLE OF THE IMAGING APPARATUS, AND CORRECTING DETECTED ROLL ANGLE

CROSS-REFERENCE TO RELATED APPLICATION

This application is based on and claims priority benefit from Japanese Patent Application No. 2007-195628, filed on Jul. 27, 2007, the disclosure of which is incorporated herein by reference in its entirety.

TECHNICAL FIELD

The present invention relates to an imaging apparatus and a method of obtaining a roll angle of the imaging apparatus using an imaging result that detects the tilt of an image and the tilt of an imaging apparatus when obtaining an image and by information of the tilt detected, corrects the tilt of an image by post-processing as necessary, thereby relates to an imaging apparatus and a method of obtaining a roll angle of the imaging apparatus that is able to adjust an image to a horizontal and vertical position with high precision.

BACKGROUND ART

In recent years, because digital cameras have become lighter and smaller in size, they can be constituted for mobile use at various places and the function of a digital camera is also incorporated to cell phones or the like.

Because digital cameras have become lighter and smaller in size, photographing is not necessarily conducted at a stable orientation, and random tilt is generated to an image when photographing because a digital camera is held by a person.

In addition, with digital cameras, there can be cases where photographing is conducted for an intentionally tilted composition as well as a vertically long composition.

In JP2004-343476A, there is disclosed an imaging apparatus as described above able to correct the tilt of the imaging result by correctly reflecting an intension of the user. In addition, in JP11-136575A, there is disclosed an imaging apparatus which inputs a plane image by reducing skewness when forming a segmented image.

In addition, there is also commercially available a leveling bottle utilizing bubbles used for confirmation of orientations, the leveling bottle is disposed in a digital camera, for example, and can be inserted in a hot shoe where an external strobe of the digital camera is installed.

However, with an imaging apparatus of such a constitution, a relative roll angle obtained from a roll angle of an image pickup device and a roll angle of a sensor has variations between individual bodies at the time of assembly and it is problematic that a photographing image cannot be adjusted to a horizontal and vertical position with high precision. In addition, a method to increase precision is also not disclosed.

In addition, in the case of a leveling bottle inserted to the hot shoe, tilt of a chassis against a horizontal direction can be corrected by the leveling bottle but it is impossible to correct in the case when a roll angle is generated to the chassis and the image pickup device.

DISCLOSURE OF THE INVENTION

The present invention is directed to solve the above-described problems in conventional technologies. An object of the present invention is to provide an imaging apparatus and a method of obtaining a roll angle of an imaging apparatus that is able to adjust an image to a horizontal and vertical position with high precision.

According to one aspect of the present invention, an imaging apparatus of the present invention includes an image pickup device, a device that obtains an image from the image pickup device, a sensor that detects a reference roll angle of the sensor when the imaging apparatus is disposed at a predetermined roll angle, a device that calculates a reference roll angle of the image pickup device by using a reference image from the image pickup device when the imaging apparatus is disposed at the predetermined roll angle, a device that corrects a roll angle of the sensor by calculating a relative roll angle from the reference roll angle of the image pickup device and the reference roll angle of the sensor. The imaging apparatus absorbs assembly variations of the image pickup device and the sensor, and can obtain the roll angle to be derived with high precision.

According to another aspect of the present invention, an imaging apparatus according to an embodiment of the present invention includes a storage device that stores information of the relative roll angle or information of variables for deriving the relative roll angle so that assembly variations of the image pickup device and the sensor are absorbed and a derived roll angle can be obtained with high precision.

According to another aspect of the present invention, an imaging apparatus according to an embodiment of the present invention includes a comparison device that compares the information stored in the storage device with information of a detected roll angle of the sensor so that assembly variations of the image pickup device and the sensor are absorbed and a derived roll angle can be obtained with high precision.

According to another aspect of the present invention, an imaging apparatus according to an embodiment of the present invention corrects the roll angle of the sensor by using the information of the relative roll angles stored in the storage device according to an orientation of the imaging apparatus so that the imaging apparatus is able to adopt the most appropriate parameters corresponding to an orientation of the imaging apparatus and obtain a derived roll angle with high precision.

According to another aspect of the present invention, an imaging apparatus according to an embodiment of the present invention includes an image pickup device, a device that obtains an image from the image pickup device, an sensor that detects a reference roll angle of the sensor when the imaging apparatus is disposed at a predetermined roll angle, a device that calculates a reference roll angle of the image pickup device by using a reference image from the image pickup device when the imaging apparatus is disposed at the predetermined roll angle and a device that corrects a roll angle of the sensor by calculating a relative roll angle from the reference roll angle of the image pickup device and the reference roll angle of the sensor so that assembly variations of the image pickup device and the sensor are absorbed and a derived roll angle can be obtained with high precision.

According to another aspect of the present invention, a method of obtaining a roll angle of an imaging apparatus according to an embodiment of the present invention that detects and corrects a roll angle is described divided into process flows, the characteristics of which are the same as an imaging apparatus according to an embodiment of the present invention.

BRIEF DESCRIPTION OF THE DRAWINGS

FIG. 1 illustrates an external appearance of a digital camera according to an embodiment of the present invention in which

FIG. 2 is a block circuit diagram that illustrates a brief overview of a system constitution within a digital camera.

BEST MODE FOR CARRYING OUT THE INVENTION

Preferred embodiments of the present invention will be explained in detail hereinafter with reference to the accompanying drawings.

Figure 1A:
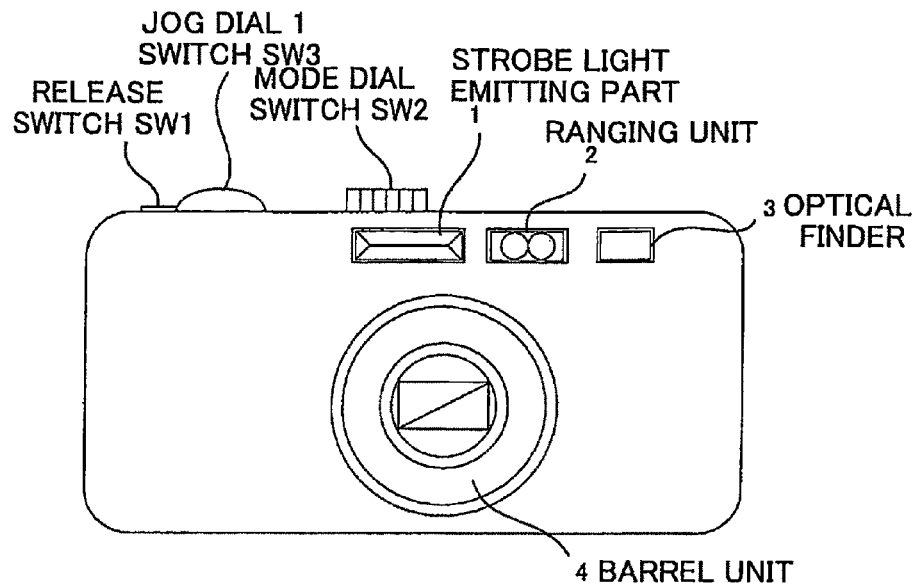
FIG. 1A is a front view.
Figure 1B:
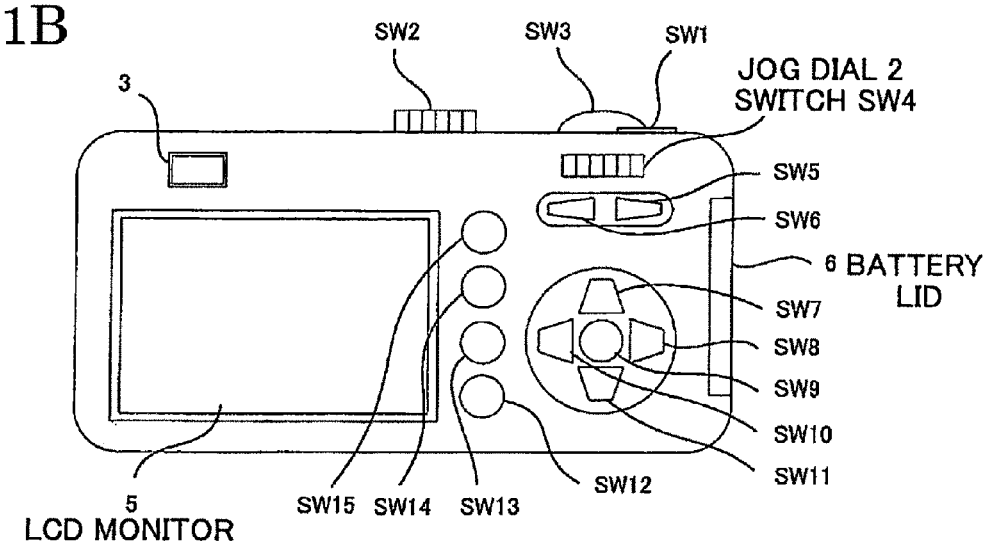
FIG. 1B is a back view.
Figure 1C:
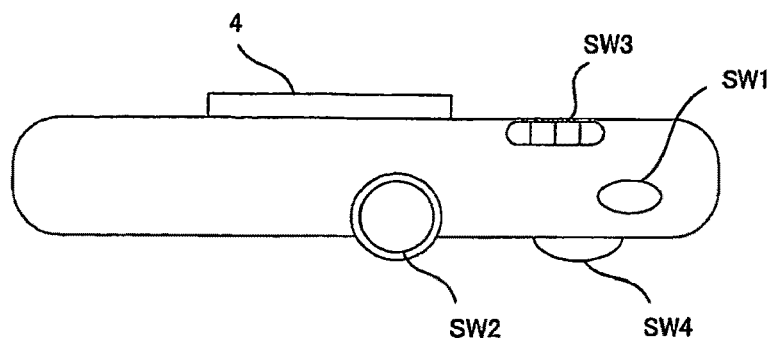
FIG. 1C is a top view.

FIGS. 1A, 1B and 1C illustrate an outside appearance of a digital camera as an embodiment of an imaging apparatus according to the present invention. In addition, FIG. 2 is a block circuit diagram that illustrates a brief overview of a system constitution within a digital camera.

As shown in FIG. 1A and FIG. 1C, a release switch (release shutter) SW1, a mode dial switch SW2 and a jog dial 1 switch SW3 are disposed on a front face and a top surface of a main body of a digital camera, respectively. In addition, a lens barrel unit 4 including a strobe light emitting part 1, a ranging unit 2, an optical finder 3 and a photographing lens is disposed.

On a back surface of the digital camera shown in FIG. 1B, an LCD monitor 5, a jog dial 2 switch SW4, a zoom switch [TELE] SW5, a zoom switch [WIDE] SW6, an up switch SW7, a right switch SW8, an OK switch SW9, a left switch SW10, a down switch/macro switch SW11, a display switch SW12, a deletion switch SW13, a menu switch SW14 and a power source switch SW15 are disposed. A battery lid 6 is disposed on a side of the main body.

Because the function and working of each member of the digital camera are widely known, the description is abbreviated hereby and a system constitution within the camera is described based on FIG. 2 and FIG. 1.

As shown in FIG. 2, reference number 104 is a digital still camera processor (referred to as processor hereinbelow). The processor 104 includes a first CCD signal processing block 1041, a second CCD signal processing block 1042, a CPU block 1043, a local SRAM 1044, a USB block 1045, a serial block 1046, a JPEG•CODEC block (the block that performs the compression•extension of JPEG) 1047, a RESIZE block (a block that enlarges•contracts the size of the pixel data by an interpolation process) 1048, a TV signal indication block (a block that converts pixel data into video signals in order to be displayed on external display devices such as liquid crystal display monitor•TV or the like) 1049, and a memory card controller block (a block that controls the memory card in which photographing pixel data is recorded) 10410. Each block is mutually connected by a bus line.

In addition, an SDRAM (synchronous dynamic random access memory) 103 that stores RAW-RGB pixel data (pixel data in a state in which white balance setting and γ setting is performed), YUV pixel data (pixel data in a state in which brightness data and color difference data conversion is performed), JPEG pixel data (pixel data in a state in which JPEG is compressed) is disposed in an external part of the processor 104. The SDRAM 103 is connected to the processor 104 via a memory controller (not illustrated) and a bus line.

The SDRAM 103, when applying various kinds of processing to the pixel data at the processor 104, temporarily stores pixel data. The stored pixel data, imported via E/E-IC102 from CCD 101, are for example "RAW-RGB pixel data" in a state where white balance setting and γ setting are performed at the first CCD signal processing block 1041 or "YUV image data" in a state which where brightness data and color difference data conversion are performed at the second CCD signal control block 1042 or "JPEG pixel data" in a state where JPEG is compressed at the JPEG and CODEC block 1047.

A ROM in which an embedded memory 107 of RAM or the like (a memory to memorize photographing image data even in the case a memory card is not inserted to a memory card slot), a control program, a parameter or the like are stored (not illustrated) is disposed in an external part of the processor 104 and these, too, are connected to the processor 104 by a bus line.

When the light source switch SW15 of the digital camera is turned on, the control program stored in the ROM is loaded to a main memory (not illustrated) of the processor 104. Thereby the processor 104 performs operational control of each part according to the control program and temporarily stores control data, parameters and so on to the embedded memory 107.

The barrel unit 4 includes a lens cylinder comprising a zoom optical system 41 having a zoom lens 41a, a focus optical system 42 having a focus lens 42a, an aperture unit 43 having an aperture stop 43a and a mechanical shutter unit 44 having a mechanical shutter 44a. The zoom lens 41a, the focus lens 42a and the aperture 43a constitute a photographing optical system. In addition, an optical axis of the photographing optical system is set as the Z axis and a plane orthogonal to the Z axis is set as the X-Y plane.

The zoom optical system 41, the focus optical system 42, the aperture unit 43 and the mechanical shutter unit 44 are respectively driven by a zoom motor 41b, a focus motor 42b, an aperture motor 43b and a mechanical shutter motor 44b.

Each motor of the barrel unit 4 is driven by a motor driver 45. The motor driver 45 is controlled by a CPU block 1043 of the processor 104.

In addition, a CCD 101, as a solid image pickup device that performs photoelectrical conversion of an optical image by each lens system of the barrel unit 4, images a subject image. The CCD 101 converts the subject image to image signals and outputs image signals to an F/E-IC102 which is a device that obtains an image from the image pickup device. The F/E-IC102 includes a CDS1021 that performs correlated double sampling to remove image noise, an AGC 1022 for adjustment gain control, and an A/D conversion part 1023 that performs analog digital conversion. That is, the F/E-IC102 applies prescribed processing to the image signals, converts an analog image signal to a digital signal and outputs the digital signal towards a first CCD signal processing block 1041 of the processor 104.

The signal control processing is performed via TG1024 by a VD (vertical synchronization)-HD (horizontal synchronization) signal outputted from the first CCD signal processing block 1041 of the processor 104. The TG1024 generates drive timing signals based on the VD-HD signal.

In addition, the processor 104 performs white balance setting or γ setting to output data of the F/E-IC102 by CCD 101, supplies a vertical synchronization signal and a horizontal synchronization signal by a first CCD signal control block 1041 and performs as filtering processing the conversion to brightness data and color difference data by a second CCD signal control block 104. In addition, the CPU block 1043 controls the operation of each part of the apparatus and stores temporarily to the local SRAM 1044 data or the like necessary for control.

The CPU block 1043 further emits light for illumination use from a strobe light emitting part 1 by controlling a strobe circuit 114. In addition, the CPU block 1043 also controls the ranging unit.

The CPU block 1043 is connected to a sub CPU 109 of the processor 104. The sub CPU 109 is connected to a manipulation key unit formed from manipulation switches SW1 through SW15. The manipulation key unit (SW1 through SW15) is a key circuit manipulated by the user. In addition, the sub CPU 109 is a CPU with ROM and RAM built into one chip, outputs to the CPU block 1043 output signals of the manipulation key unit (SW1 through SW15) and so on as manipulation information for the user.

USB block 1045 is connected to a USB connector (not illustrated) with an external device such as a personal computer or the like to perform USB communication. In addition, the serial block 1046 is connected to an RS-232C connector or the like with an external device via a serial driver circuit (not illustrated) to perform serial communication. The TV signal indication block 1049 is connected to the LCD monitor 5 via an LCD driver 108, and is also connected to a video jack (a jack in order to connect a camera to an external display device such as TV or the like) via a video AMP (an AMP (amplifier) in order to convert video signals outputted from the TV signal indication block 1049 to 75 Ω impedance) 119. The memory card controller block 10410 is connected to a card contact point by a memory card slot (not illustrated).

The LCD driver 108 drives the LCD monitor 5 and fulfills a role to convert video signals outputted from the TV signal indication block 1049 to signals to be displayed by the LCD monitor 5. The LCD monitor 5 is used to monitor the state of a subject before photographing, to confirm a photographing image and to display image data recorded in the memory card or built-in memory 107.

Figure 3:
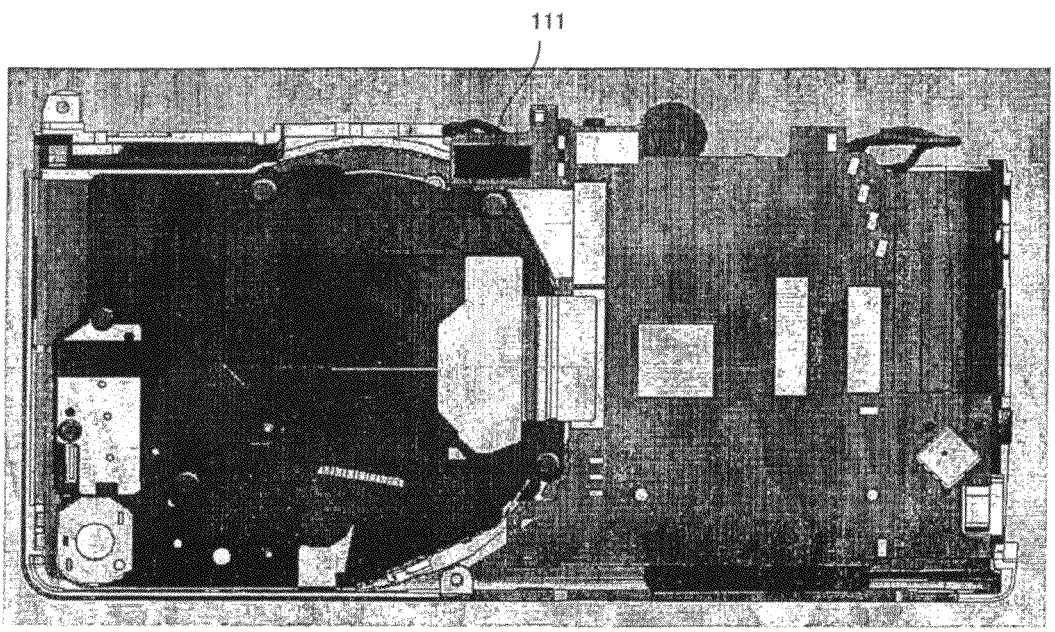
FIG. 3 is a diagram that illustrates a mounting example of a sensor within a digital camera.

In addition, a sensor, specifically, an acceleration sensor 111 is mounted on any of the print circuit board (PCB) that constitutes each part described above (refer to FIG. 3) and outputs data of the two axis X, Y and temperature T. The tilt (roll angle) of the digital camera is for example calculated by the CPU block 1043 from the data and displayed on the LCD monitor 5 or the like.

Next, a method for calibration of variations in individual bodies of a relative roll angle between a CCD and a sensor, specifically, an acceleration sensor of digital cameras in the factory is described.

Figure 4A:
FIG. 4A is a disposition diagram of a digital camera and a chart.
Figure 4B:
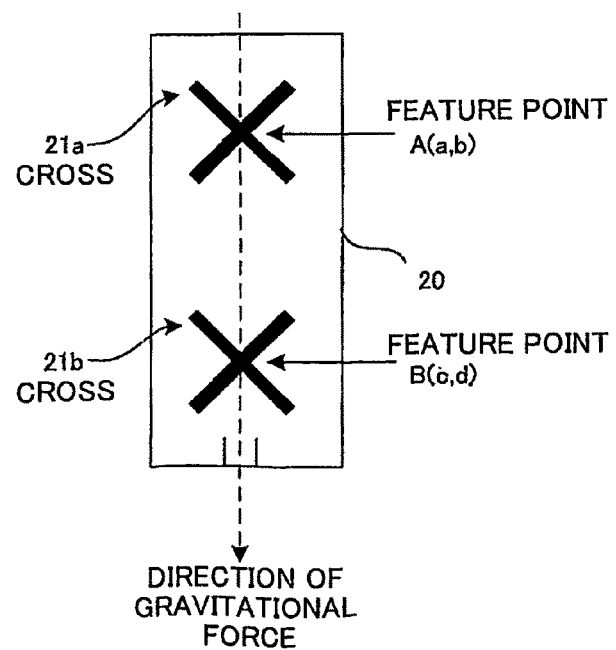
FIG. 4B is a diagram that illustrates a chart.

First, a digital camera 10 and a chart 20 are set up as illustrated in FIG. 4A. The digital camera 10 is disposed to be approximately horizontal. As illustrated in FIG. 4B, the line that connects the center (feature point) of a cross 21a and a cross 21b of chart 20 is disposed to be parallel against a direction of gravitational force. In addition, the center of the cross 21a on one side is set as feature point A, and the center of the cross 21b on the other side is set as feature point B.

The output of a sensor, specifically, an acceleration sensor (referred to as G sensor hereinbelow) of the digital camera 10 is obtained. (Hereby G sensor output of the X axis is X0, G sensor output of the Y axis is Y0, temperature output is T0.) Chart 20 is photographed one second later so that an image is obtained. The coordinate of feature point A (set as (a, b)) and the coordinate of feature point B (set as (c, d)) of chart 20 is read from the image so that a roll angle θc of CCD against a chart disposed in absolute vertical form is calculated.

Figure 5:
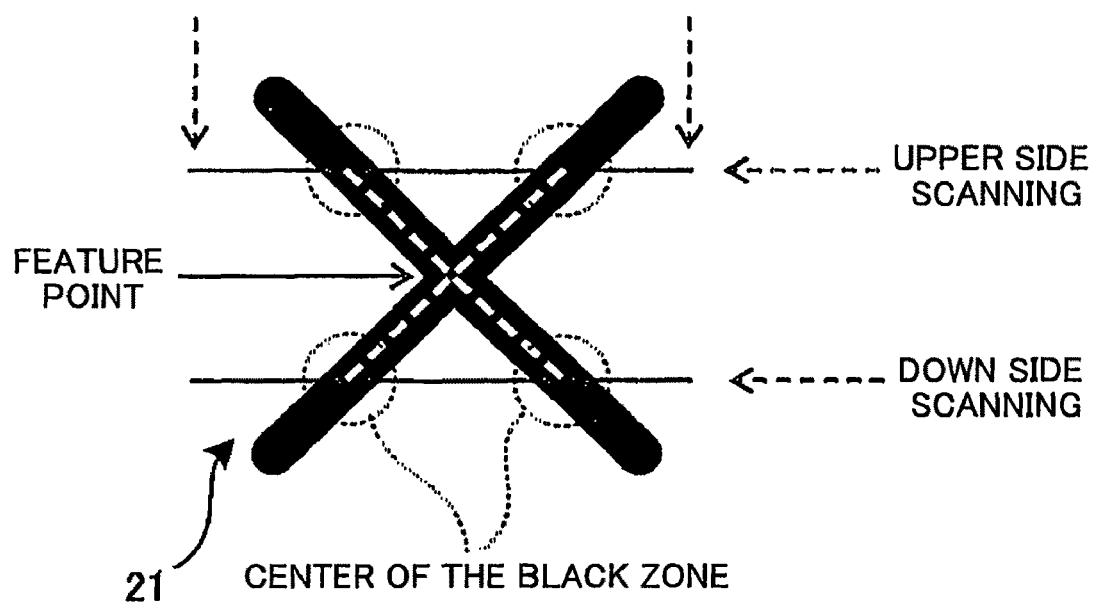
FIG. 5 is a diagram that describes a scan method to scan crosses on the chart.

A scan method of an image is explained referring to FIG. 5. Brightness data is obtained for an image of the cross 21 in a sequence from the upper side towards a horizontal direction. Brightness by scanning lowers when passing through a black portion of the cross 21. The midpoint of a coordinate whereby brightness is below the predetermined threshold value and a coordinate whereby brightness is above the predetermined threshold value is set as the center of the black zone of the cross. Brightness change by a scanning in the horizontal direction is first detected twice, then further detected once only at a feature point and detected twice again thereafter. By upper side scanning and down side scanning which twice detect brightness change of the cross 21 when scanning, a total of four centers of the black zone of the cross are obtained. The coordinate of the intersecting point is calculated by cross-coupling the 4 coordinates and is set as the center (feature point) of the cross 21.

A calculation method of a roll angle θc of CCD against a chart 20 shown in FIG. 4B is described. From the coordinates of feature point A (a, b) and feature point B (c, d), the roll angle θc of CCD by a device that calculates a reference roll angle of the image pickup device is obtained, (formula 1)

[Formula 1]

It is set as:

in the case $a = c$, $$\theta c[deg] = 90$$

in the case $a \neq c$, $$\theta c[deg] = 90 - \frac{180}{\pi} \times \arctan\left[\frac{(b-d)}{(a-c)}\right]$$

Next, a roll angle θs of the G sensor with a tilt against the horizon is calculated by a sensor that detects a reference roll angle of the sensor. From X axis output X0, Y axis output Y0 and temperature output T0 of the G sensor, (formula 2)

[Formula 2]

$$\theta s[deg] = \frac{180}{\pi} \times \arctan\left[\frac{(Y0 - G0)}{(X0 - G0)}\right]$$

$$G0 = 2048 + 0.4 \times T0$$

Where G0 is the output when gravity is zero.

"When gravity is zero" refers to the cases where an axis of a sensor of the G sensor is disposed vertical against gravity or when the axis is in free fall. By comparison, when the axis of the sensor is disposed parallel against gravity, the output becomes 1G, and when disposed 45 degrees against gravity, the output becomes $1/\sqrt{2}$G.

In addition, the output value of the G sensor is represented by (C×(gravity)+the output when gravity is zero) (C is a constant). In order to calculate gravity, it is necessary to calculate the output when gravity is zero and deduct from the output value. The G sensor outputs anywhere near "2048" when gravity is zero but since the G sensor has temperature properties, G0 is more precisely represented by "G0=2048+ 0.4×t".

The difference between the roll angle θc of the CCD calculated from the image and the roll angle θs calculated from the G sensor is calculated by a device that corrects a roll angle of a sensor by calculating a relative roll angle from the reference roll angle of the image pickup device and the reference roll angle of the sensor. This is set as θ0 (lateral photographing) which becomes a relative roll angle of the CCD 101 and the G sensor. The relative roll angle θ0 is stored in a storage device (for example, nonvolatile memory: EEPROM).

In addition, the digital camera 10 is set to a longitudinal photographing of +90 degrees, a relative roll angle θ90 is calculated using the same method described above and the relative roll angle θ90 calculated is stored in a storage device. Furthermore, the digital camera 10 is set to a longitudinal photographing of −90 degrees, a relative roll angle θ270 is calculated using the same method described above and the relative roll angle θ270 calculated is stored in a storage device.

The relative roll angles of the CCD and the G sensor are not dependent on an orientation of the imaging apparatus but the output of the G sensor changes measurably according to an orientation of the imaging apparatus so that the values calculated respectively differ. In order to calculate the degree of horizontalness with further high precision, frequently used relative roll angles of the 3 orientations of lateral photographing and longitudinal photographing (+90 degree, −90 degree) are stored.

A detection operation of the degree of horizontalness when the digital camera is used by a user is described. The output from the G sensor is set as X axis output x, Y axis output y and temperature output t, the output when gravity is zero is set as g(t), the ratio of gravity between the X axis and the Y axis is set as R, and the detection roll angle is set as θ, by a comparison device that compares the information stored in the storage device with information of a detected roll angle of the sensor, which gives (formula 3)

It is set as: [Formula 3]

$$g(t) = 2048 + 0.4 \times t$$

$$R(x, y, t) = \frac{(y - g(t))}{(x - g(t))}$$

$$\theta = \frac{180}{\pi} \times \arctan(R(x, y, t)) - \theta 0$$

where the detection roll angle θ yields two candidates in a range of 0<θ<360, the detection roll angle θ is determined by judging whether x−g(t) is plus or minus so that one of the candidates is selected. In addition, θ0 is a relative roll angle of lateral photographing of the storage device.

In addition, when the detection roll angle θ is in the vicinity of +90 degrees, a relative roll angle θ90 is used instead of the relative roll angle θ0, which gives (formula 4)

$$\theta = \frac{180}{\pi} \times \arctan(R(x, y, t)) - \theta 90$$ [Formula 4]

so that the detection roll angle θ is recalculated.

In addition, when the detection roll angle θ is in the vicinity of −90 degrees, a relative roll angle θ270 is used instead of the relative roll angle θ0, which gives (formula 5)

$$\theta = \frac{180}{\pi} \times \arctan(R(x, y, t)) - \theta 270$$ [Formula 5]

so that the detection roll angle θ is recalculated.

As described above, the determined detection roll angle θ is indicated on the LCD monitor 5 shown in FIG. 1 and compensated. For example, when the value of the detection roll angle θ is −0.25<θ<0.25, the user is not notified (for example, warning signal or lighting/blinking of LED), otherwise the user is notified about the degree of horizontalness.

Thereby assembly variations of the image pick up device and the acceleration sensor can be absorbed so that a roll angle can be obtained with high precision and an image can be adjusted to a horizontal and vertical position with high precision.

ADVANTAGEOUS EFFECT OF THE INVENTION

The present invention makes it possible to absorb the assembly variations of the image pickup device and the sensor, specifically, the acceleration sensor, obtain a derived roll angle with high precision and obtain the effect that an image can be adjusted to a horizontal and vertical position with high precision.

INDUSTRIAL AVAILABILITY

An imaging apparatus according to the present invention and a method of obtaining a roll angle of the imaging apparatus absorb assembly variations of the image pickup device and the sensor, specifically, an acceleration sensor. By obtaining with high precision a roll angle to be derived, an image can be adjusted to a horizontal and vertical position with high precision so that it is useful as an imaging apparatus able to correct a tilted image of a smaller sized and lightweight digital camera or the like.

Although the present invention has been described in terms of exemplary embodiments, it is not limited thereto. It should be appreciated that variations may be made in the embodiments described by persons skilled in the art without departing from the scope of the present invention as defined by the following claims.

The invention claimed is:

1. An imaging apparatus, comprising:
   an image pickup device;
   a device that obtains an image from the image pickup device;
   an acceleration sensor that detects a roll angle of the acceleration sensor, wherein the acceleration sensor detects a reference roll angle when the imaging apparatus is disposed at a horizontal position, a longitudinal photographing of +90 degrees, and a longitudinal photographing of −90 degrees, respectively;
   a device that calculates a reference roll angle of the image pickup device by using a reference image from the image pickup device when the imaging apparatus is disposed at the horizontal position, the longitudinal photographing of +90 degrees, and the longitudinal photographing of −90 degrees, respectively;
   a device that calculates a first difference as a first relative roll angle between the reference roll angle of the image pickup device when the imaging apparatus is disposed at the horizontal position and the reference roll angle of the sensor when the imaging apparatus is disposed at the horizontal position, a second difference as a second relative roll angle between the reference roll angle of the image pickup device when the imaging apparatus is disposed at the longitudinal photographing of +90 degrees and the reference roll angle of the sensor when the imaging apparatus is disposed at the longitudinal photographing of +90 degrees, and a third difference as a third relative roll angle between the reference roll angle of the image pickup device when the imaging apparatus is disposed at the longitudinal photographing of −90 degrees and the reference roll angle of the sensor when the imaging apparatus is disposed at the longitudinal photographing of −90 degrees; and a device that corrects the detected roll angle of the acceleration sensor by using one of the first, second and third relative roll angles.

2. An imaging apparatus according to claim 1, wherein the device calculates a reference roll angle of the image pickup device by using a reference image that is obtained by photographing a chart having feature points, when the imaging apparatus is disposed in a horizontal position.

3. An imaging apparatus according to claim 1, further comprising: a storage device that stores information of the relative roll angles or information of variables for deriving the relative roll angles.

4. An imaging apparatus according to claim 3, further comprising a comparison device that compares the information stored in the storage device with information of a detected roll angle of the sensor.

5. A method of obtaining a roll angle of an imaging apparatus, comprising:

providing the imaging apparatus with an image pickup device; a device that obtains an image from the image pickup device; an acceleration sensor that detects a roll angle of the acceleration sensor, wherein the acceleration sensor detects a reference roll angle when the imaging apparatus is disposed at a horizontal position, a longitudinal photographing of +90 degrees, and a longitudinal photographing of −90 degrees, respectively; a device that calculates a reference roll angle of the image pickup device by using a reference image from the image pickup device when the imaging apparatus is disposed at the horizontal position, the longitudinal photographing of +90 degrees, and the longitudinal photographing of −90 degrees, respectively; a device that calculates a first difference as a first relative roll angle between the reference roll angle of the image pickup device when the imaging apparatus is disposed at the horizontal position and the reference roll angle of the sensor when the imaging apparatus is disposed at the horizontal position, a second difference as a second relative roll angle between the reference roll angle of the image pickup device when the imaging apparatus is disposed at the longitudinal photographing of +90 degrees and the reference roll angle of the sensor when the imaging apparatus is disposed at the longitudinal photographing of +90 degrees, and a third difference as a third relative roll angle between the reference roll angle of the image pickup device when the imaging apparatus is disposed at the longitudinal photographing of −90 degrees and the reference roll angle of the sensor when the imaging apparatus is disposed at the longitudinal photographing of −90 degrees; and a device that corrects the detected roll angle of the acceleration sensor by using one of the first, second and third relative roll angles;

obtaining an image from the image pickup device;

detecting a roll angle of the sensor;

calculating the reference roll angles of the image pickup device; and correcting the roll angle of the sensor.

6. A method of obtaining a roll angle of an imaging apparatus according to claim 5, comprising: storing in a storage device information of the relative roll angles or information of variables for deriving the relative roll angles.

7. A method of obtaining a roll angle of an imaging apparatus according to claim 6, comprising: comparing the information stored in the storage device with information of a detected roll angle of the sensor.

* * * * *